(12) United States Patent
Kobayashi

(10) Patent No.: US 10,154,504 B2
(45) Date of Patent: Dec. 11, 2018

(54) COMMUNICATION SYSTEM, BASE STATION, AND BASE-STATION CONTROL METHOD

(71) Applicant: FUJITSU LIMITED, Kawasaki-shi, Kanagawa (JP)

(72) Inventor: Takaharu Kobayashi, Yamato (JP)

(73) Assignee: FUJITSU LIMITED, Kawasaki (JP)

( * ) Notice: Subject to any disclaimer, the term of this patent is extended or adjusted under 35 U.S.C. 154(b) by 64 days.

(21) Appl. No.: 15/377,169

(22) Filed: Dec. 13, 2016

(65) Prior Publication Data
US 2017/0094674 A1  Mar. 30, 2017

Related U.S. Application Data

(63) Continuation of application No. PCT/JP2014/067987, filed on Jul. 4, 2014.

(51) Int. Cl.
H04W 72/08 (2009.01)
H04W 16/14 (2009.01)
(Continued)

(52) U.S. Cl.
CPC .......... H04W 72/082 (2013.01); H04B 7/024 (2013.01); H04B 7/0486 (2013.01);
(Continued)

(58) Field of Classification Search
None
See application file for complete search history.

(56) References Cited

U.S. PATENT DOCUMENTS

2011/0286418 A1* 11/2011 Liu ................ H04L 45/125
370/329
2013/0094547 A1* 4/2013 Kang ................ H04B 15/00
375/219
(Continued)

FOREIGN PATENT DOCUMENTS

JP 2012-156798 A 8/2012
WO 2013/157331 A1 10/2013
(Continued)

OTHER PUBLICATIONS

Notification of Reasons for Refusal issued by the Japan Patent Office for corresponding Japanese Patent Application No. 2016-530797, dated Jan. 23, 2018, with an English translation.
(Continued)

Primary Examiner — Hicham B Foud
(74) Attorney, Agent, or Firm — Myers Wolin, LLC

(57) ABSTRACT

A communication system includes a first base station that forms a first coverage area, and a second base station that forms a second coverage area different from the first coverage area and uses a same as a radio resource to be used by the first base station, wherein the second base station determines a number of assignment streams at the second base station in the radio resource, computes a number of interference signals removable by the second base station in the radio resource based on a number of receiving antennas included in the second base station and the number of assignment streams, and notifies the first base station of the number of interference signals in the radio resource, and the first base station determines a number of assignment streams at the first base station in the radio resource by using the number of interference signals as an upper limit.

3 Claims, 18 Drawing Sheets

(51) Int. Cl.
*H04W 72/06* (2009.01)
*H04B 7/024* (2017.01)
*H04B 7/0456* (2017.01)
*H04L 5/00* (2006.01)
*H04W 16/16* (2009.01)
*H04W 16/32* (2009.01)

(52) U.S. Cl.
CPC ............... *H04L 5/00* (2013.01); *H04W 16/14* (2013.01); *H04W 72/06* (2013.01); *H04W 16/16* (2013.01); *H04W 16/32* (2013.01)

(56) References Cited

U.S. PATENT DOCUMENTS

| | | | | |
|---|---|---|---|---|
| 2013/0287132 A1* | 10/2013 | Taoka | ................... | H04B 7/0452 375/267 |
| 2013/0324136 A1* | 12/2013 | Hirata | ................... | H04W 16/32 455/447 |
| 2014/0011493 A1* | 1/2014 | Toh | ....................... | H04W 16/14 455/422.1 |
| 2014/0135049 A1* | 5/2014 | Hirata | ................... | H04W 28/16 455/501 |
| 2015/0029951 A1 | 1/2015 | Sano et al. | | |

FOREIGN PATENT DOCUMENTS

| WO | 2013/157482 A1 | 10/2013 |
|---|---|---|
| WO | 2014/017155 A1 | 1/2014 |

OTHER PUBLICATIONS

China Telecom, "Simulation and field test results of MMSE-IRC receiver at LTE BS", Agenda Item: 12, 3GPP TSG-RAN WG4 Meeting #68, Barcelona, Spain, Aug. 19-23, 2013.

International Search Report issued for corresponding International Patent Application No. PCT/JP2014/067987, dated Sep. 30, 2014, with an English translation.

* cited by examiner

COMMUNICATION SYSTEM, BASE STATION, AND BASE-STATION CONTROL METHOD

CROSS-REFERENCE TO RELATED APPLICATION

This application is a continuation of International Application No. PCT/JP2014/067987, filed on Jul. 4, 2014, the entire contents of which are incorporated herein by reference.

FIELD

The embodiments discussed herein are related to a communication system, a base station, and a base-station control method.

BACKGROUND

In recent years, there is performed the study on a communication system called a Heterogeneous Network (HetNet) in which a "pico base station" of which the transmission power and coverage area are small is placed under a "macro base station" of which the transmission power and coverage area are large. The coverage area formed by each base station can be called a cell or a sector in some cases. In the HetNet, because the traffic of the macro base station can be offloaded to the pico base station, the improvement of communication speed can be achieved.

The transmission power of an uplink in user equipment (UE) is determined in accordance with a path loss of the uplink. In other words, the larger the path loss of the uplink is, the larger the transmission power of the uplink becomes. As described above, in the HetNet, the size of the coverage area of the macro base station is different from that of the coverage area of the pico base station. For this reason, a large transmission-power difference is caused between user equipment located at the edge (hereinafter, referred to as "cell edge") of the coverage area of the pico base station and user equipment located at the cell edge of the macro base station. Therefore, user equipment located within the coverage area of the pico base station receives large interference from user equipment located at the cell edge of the macro base station. Hereinafter, user equipment that is located within the coverage area of a pico base station and is being connected to the pico base station can be referred to as "pico UE" in some cases. Moreover, user equipment that is located within the coverage area of a macro base station and is being connected to the macro base station can be referred to as "macro UE" in some case.

As a technology for reducing such an interference influence, there are reception techniques called IRC (Interference Reject Combining) reception. In the IRC, without using MMSE (Minimum Mean Square Error) reception weight $W^H$ (Equation (1)) that uses average interference noise power, an interference influence is reduced by multiplying reception weight $W^H$ (Equation (2)) that uses a correlation matrix of an interference signal by a received signal. In Equations (1) and (2), "$h_p$" indicates a channel estimation value between a pico base station and user equipment connected to the pico base station, "$\sigma_I$" indicates average interference noise power, "I" indicates a unit matrix, "$R_I$" indicates a correlation matrix of an interference signal that includes noise power, "$y_p$" indicates a received signal at the pico base station, and "$s_p$" indicates a reference signal of the user equipment connected to the pico base station. Moreover, "$X^H$" indicates the conjugate transpose of a matrix X, and "E[ ]" indicates an ensemble average.

$$W_H = h_p(h_p h_p^H + \sigma_I I)^{-1} \quad (1)$$

$$W_H = h_p(h_p h_p^H + R_I)^{-1}$$

$$R_I = E[(y_p - h_p s_p)(y_p - h_p s_p)] \quad (2)$$

Examples of related-art are described in Japanese Laid-open Patent Publication No. 2012-156798

Herein, in the IRC reception, when the sum of the number of desired signals and the number of interference signals is not more than the number of receiving antennas, a beam is directed to a desired signal and NULL is directed to an interference signal so as to be able to avoid interference. Therefore, in a case where the number of interference signals becomes larger than "the number of receiving antennas−the number of desired signals", interference is clearly hard to be avoided and thus reception quality is degraded. In a pico base station that performs IRC reception in an FDD (Frequency Division Duplex) communication system in which different frequency bands are used in an uplink and a downlink, "the number of desired signals" is equivalent to "the number of transmission streams of pico UE", and "the number of interference signals" is equivalent to "the number of transmission streams of macro UE". Therefore, for example, in a case where MU-MIMO (Multiuser Multiple Input Multiple Output) communication is performed between a macro base station and macro UE, the number of interference signals at a pico base station becomes large, and thus the number of interference signals becomes larger than "the number of receiving antennas−the number of desired signals" so as to degrade reception quality in the pico base station.

SUMMARY

According to an aspect of an embodiment, a communication system includes a first base station that forms a first coverage area, and a second base station that forms a second coverage area different from the first coverage area and uses a same as a radio resource to be used by the first base station, wherein the second base station determines a number of assignment streams at the second base station in the radio resource, computes a number of interference signals removable by the second base station in the radio resource based on a number of receiving antennas included in the second base station and the number of assignment streams, and notifies the first base station of the number of interference signals in the radio resource, and the first base station determines a number of assignment streams at the first base station in the radio resource by using the number of interference signals as an upper limit.

According to another aspect of an embodiment, a base station that forms a second coverage area different from a first coverage area formed by another base station and uses a same as a radio resource to be used by the other base station includes a plurality of receiving antennas, a determining unit that determines a number of assignment streams at the base station in the radio resource, a computing unit that computes a number of interference signals removable by the base station in the radio resource based on a number of the plurality of receiving antennas and the number of assignment streams, and a transmitting unit that transmits notification of the number of interference signals in the radio resource to the other base station.

According to still another aspect of an embodiment, a base station that forms a first coverage area different from a second coverage area formed by another base station and uses a same as a radio resource to be used by the other base station includes a receiving unit that receives notification of a number of interference signals removable by the other base station, the number of interference signals being computed by the other base station in the radio resource, and a determining unit that determines a number of assignment streams at the base station in the radio resource by using the number of interference signals as an upper limit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. Moreover, the communication system, the base station, and the base-station control method disclosed in the present application are not limited to the embodiments explained below. In these embodiments, components having the same function and steps performing the same process have the same reference numbers, and the overlapping explanations are omitted.

[a] First Embodiment

Configuration of Communication System

Figure 1:
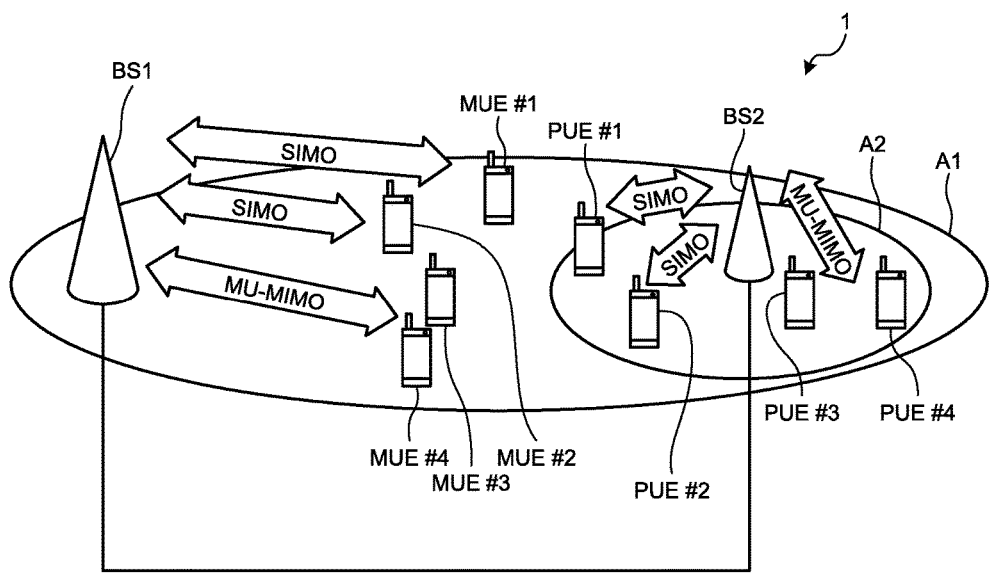
FIG. 1 is a diagram illustrating a configuration example of a communication system according to a first embodiment.

FIG. 1 is a diagram illustrating a configuration example of a communication system according to the first embodiment. Hereinafter, macro UE and pico UE can be written as "MUE" and "PUE", respectively in some cases. The communication system 1 illustrated in FIG. 1 includes a macro base station BS1, a pico base station BS2, MUEs #1 to #4, and PUEs #1 to #4. The communication system 1 is a communication system that employs an FDD method. The macro base station BS1 forms a coverage area A1. The pico base station BS2 forms a coverage area A2 smaller than the coverage area A1. The macro base station BS1 and the pico base station BS2 are connected to each other by using an X2 interface or the like to be able to perform information interchange and cooperative operations. As an example, FIG. 1 illustrates a case where each of MUE #1 and MUE #2 performs SIMO (Single Input Multiple Output) communication with the macro base station BS1 and each of PUE #1 and PUE #2 performs SIMO communication with the pico base station BS2. Moreover, FIG. 1 illustrates a case where MUE #3 and MUE #4 perform MU-MIMO communication with the macro base station BS1 and PUE #3 and PUE #4 perform MU-MIMO communication with the pico base station BS2.

Hereinafter, when MUEs #1 to #4 are not distinguished individually, they can be collectively referred to as MUE, and when PUEs #1 to #4 are not distinguished individually, they can be collectively referred to as PUE. Although four MUEs and four PUEs are illustrated in FIG. 1 as an example, the numbers of MUEs and PUEs are not limited to the above.

Process Sequence of Communication System

Figure 2:
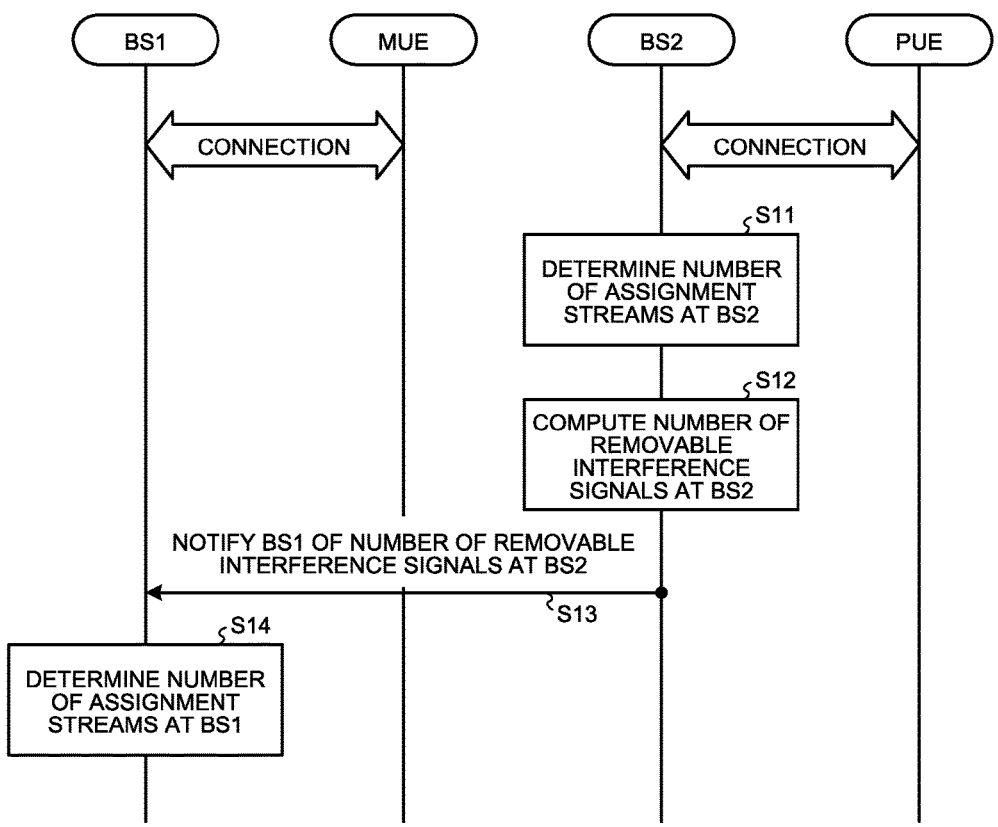
FIG. 2 is a diagram illustrating an example of a process sequence of the communication system according to the first embodiment.

FIG. 2 is a diagram illustrating an example of a process sequence of the communication system according to the first embodiment.

In states where the macro base station BS1 is connected to MUE and the pico base station BS2 is connected to PUE, the pico base station BS2 determines the number of assignment streams at the pico base station BS2 (Step S11). The pico base station BS2 determines the number of assignment streams at the pico base station BS2 for each of uplink radio frequency resources that are able to be used by both of the macro base station BS1 and the pico base station BS2. The number of assignment streams at the pico base station BS2 is the number of uplink transmission streams that are assigned to PUE.

Next, the pico base station BS2 computes the number of removable interference signals at the pico base station BS2 (Step S12). The pico base station BS2 computes the number of removable interference signals for each of the uplink radio frequency resources on the basis of the number of receiving antennas of the pico base station BS2 and the number of assignment streams at the pico base station BS2. For example, the pico base station BS2 computes, for each of the uplink radio frequency resources, a number obtained by subtracting the number of assignment streams from the number of receiving antennas as the number of removable interference signals.

Next, the pico base station BS2 notifies the macro base station BS1 of the number of interference signals computed in Step S12 (Step S13).

The macro base station BS1 that receives the notification of Step S13 determines the number of assignment streams at the macro base station BS1 by using the number of interference signals computed in Step S12 as an upper limit for each of the uplink radio frequency resources (Step S14). The number of assignment streams at the macro base station BS1 is the number of uplink transmission streams that are assigned to MUE.

Operation of Communication System

Figure 3:
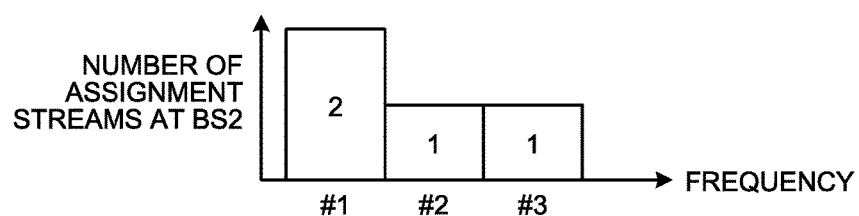
FIG. 3 is a diagram explaining an operation example of the communication system according to the first embodiment.
Figure 4:
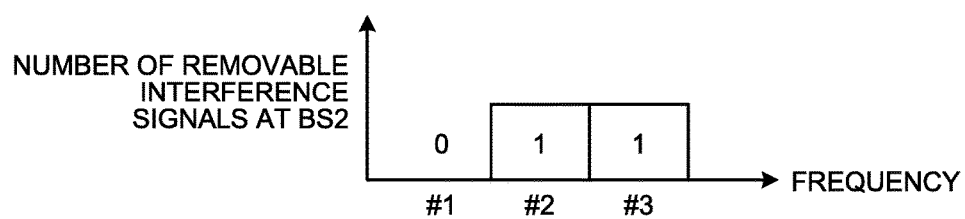
FIG. 4 is a diagram explaining an operation example of the communication system according to the first embodiment.
Figure 5:
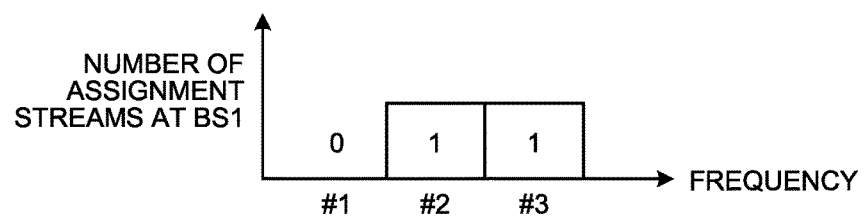
FIG. 5 is a diagram explaining an operation example of the communication system according to the first embodiment.

FIGS. 3 to 5 are diagrams explaining an operation example of the communication system according to the first embodiment. In FIGS. 3 to 5, radio frequency resources #1, #2, and #3 are an uplink radio frequency resource that is able to be used by both of the macro base station BS1 and the pico base station BS2. In other words, the macro base station BS1 and the pico base station BS2 use the same predetermined radio frequency resource.

First, the pico base station BS2 determines the number $A_p(i)$ of assignment streams for each of the radio frequency resources #1, #2, and #3. In this case, "i" indicates a number of a radio frequency resource. Herein, numbers "1", "2", and "3" correspond to #1, #2, and #3 respectively. For example, as illustrated in FIG. 3, the pico base station BS2 determines the number $A_p(1)$ of assignment streams of the radio frequency resource #1 to "2", determines the number $A_p(2)$ of assignment streams of the radio frequency resource #2 to "1", and determines the number $A_p(3)$ of assignment streams of the radio frequency resource #3 to "1". The pico base station BS2 assigns, until the determined number of assignment streams is updated, an uplink transmission stream to each PUE for each subframe so that the number of streams of each radio frequency resource is identical with the number $A_p(i)$ of assignment streams. For example, the pico base station BS2 simultaneously assigns PUE #3 and PUE #4 to the radio frequency resource #1 to perform MU-MIMO communication, and respectively assigns PUE #1 and PUE #2 performing SIMO communication to the radio frequency resources #2 and #3.

Next, the pico base station BS2 computes the number $B_p(i)$ of removable interference signals at the pico base station BS2 for each of the radio frequency resources #1, #2, and #3 in accordance with Equation (3). In Equation (3), "$N_p$" indicates the number of receiving antennas of the pico base station BS2.

$$B_p(i)=N_p-A_p(i) \quad (3)$$

Therefore, for example, when the number of assignment streams at the pico base station BS2 is as illustrated in FIG. 3 and "$N_p=2$", the number of removable interference signals at the pico base station BS2 is as illustrated in FIG. 4. In other words, the pico base station BS2 can remove one interference signal at each of the radio frequency resources #2 and #3, but it is difficult for the pico base station BS2 to remove an interference signal at the radio frequency resource #1.

Next, the pico base station BS2 notifies the macro base station BS1 of the number $B_p(i)$ of removable interference signals.

The macro base station BS1 that receives the notification of $B_p(i)$ determines the number $A_m(i)$ of assignment streams at the macro base station BS1 by using $B_p(i)$ as an upper limit for each of the radio frequency resources #1, #2, and #3. For example, the macro base station BS1 determines $A_m(i)$ in accordance with Equation (4). Therefore, the number of assignment streams at the macro base station BS1 becomes as illustrated in FIG. 5.

$$A_m(i)=B_p(i) \quad (4)$$

Then, the macro base station BS1 assigns an uplink transmission stream to each MUE so that the number of streams of each of the radio frequency resources #1, #2, and #3 is identical with the number $A_m(i)$ of assignment streams. For example, the macro base station BS1 does not assign MUE to the radio frequency resource #1 of which the number of assignment streams is "0", and respectively assigns MUEs #1 and #2 performing SIMO communication to the radio frequency resources #2 and #3 of which the number of assignment streams is "1". Alternatively, when respectively assigning MUEs #3 and #4 to the radio frequency resources #2 and #3, the macro base station BS1 changes communication with MUEs #3 and #4 from MU-MIMO communication to SIMO communication.

Configuration of Pico Base Station

Figure 6:
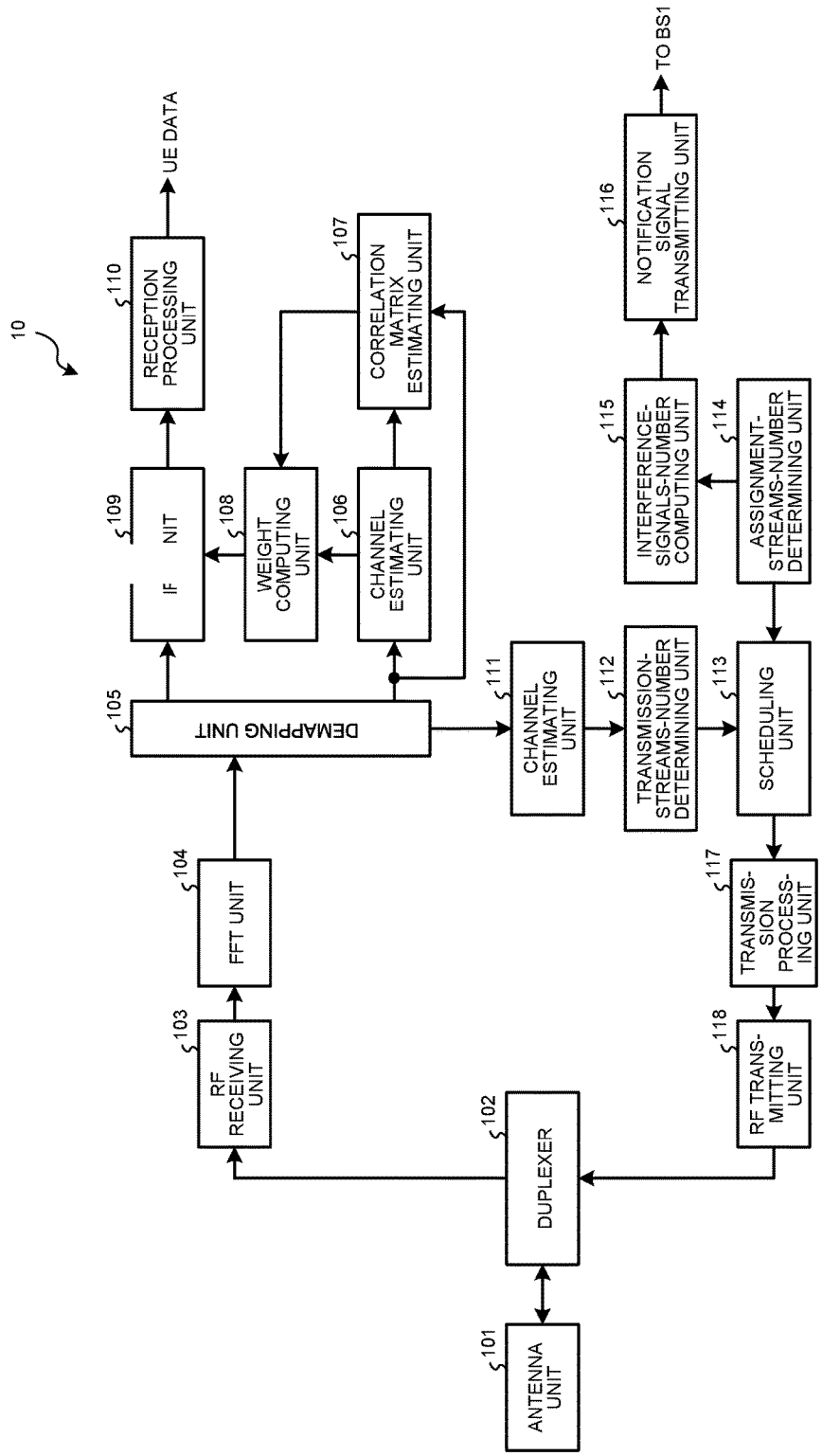
FIG. 6 is a functional block diagram illustrating a configuration example of a pico base station according to the first embodiment.

FIG. 6 is a functional block diagram illustrating a configuration example of a pico base station according to the first embodiment. The pico base station 10 illustrated in FIG. 6 is equivalent to the pico base station BS2 illustrated in FIG. 1.

In FIG. 6, the pico base station 10 includes an antenna unit 101, a duplexer 102, an RF (Radio Frequency) receiving unit 103, an FFT (Fast Fourier Transform) unit 104, a demapping unit 105, a channel estimating unit 106, and a correlation matrix estimating unit 107. The pico base station 10 further includes a weight computing unit 108, an IRC unit 109, a reception processing unit 110, a channel estimating unit 111, a transmission-streams-number determining unit 112, a scheduling unit 113, an assignment-streams-number determining unit 114, and an interference-signals-number computing unit 115. The pico base station 10 further includes a notification signal transmitting unit 116, a transmission processing unit 117, and an RF transmitting unit 118.

The antenna unit 101 is formed of a plurality of antennas. Because the pico base station 10 includes the duplexer 102, the plurality of antennas that forms the antenna unit 101 functions as receiving antennas and transmitting antennas. Therefore, the number of the plurality of antennas is equivalent to the number of receiving antennas or the number of transmitting antennas.

The RF receiving unit 103 receives an OFDM (Orthogonal Frequency Division Multiplexing) signal transmitted from PUE via the antenna unit 101 and the duplexer 102. The RF receiving unit 103 performs a radio reception process such as down-conversion and analog-to-digital conversion on the received OFDM signal to obtain a baseband OFDM signal, and outputs this signal to the FFT unit 104. Herein, CP (Cyclic Prefix) is added to the baseband OFDM signal.

The FFT unit 104 removes CP from the baseband OFDM signal, performs an FFT process on an OFDM signal after removing CP to convert the OFDM signal into a frequency-domain signal, and outputs the frequency-domain signal to the demapping unit 105.

The demapping unit 105 extracts a PUSCH (Physical Uplink Shared Channel) signal, a DMRS (Demodulation Reference Signal), and an SRS (Sounding Reference Signal) from the frequency-domain signal. The demapping unit 105 outputs the PUSCH signal to the IRC unit 109, outputs the DMRS to the channel estimating unit 106 and the correlation matrix estimating unit 107, and outputs the SRS to the channel estimating unit 111.

The channel estimating unit 106 performs uplink channel estimation by using the DMRS, and outputs a channel estimation result to the weight computing unit 108 and the correlation matrix estimating unit 107.

The correlation matrix estimating unit 107 estimates a correlation matrix $R_I$ illustrated in Equation (2) by using the channel estimation result in the channel estimating unit 106, and outputs the result to the weight computing unit 108.

The weight computing unit 108 computes the reception weight $W^H$ illustrated in Equation (2) by using the channel estimation result in the channel estimating unit 106 and the correlation matrix $R_I$, and outputs the reception weight to the IRC unit 109.

The IRC unit 109 performs IRC on the PUSCH signal by multiplying the reception weight $W^H$ illustrated in Equation (2) by the PUSCH signal, and outputs a PUSCH signal after performing IRC to the reception processing unit 110.

The reception processing unit 110 performs a demodulation process and a decoding process on the PUSCH signal after performing IRC to obtain UE data. The UE data is data transmitted from each PUE.

The channel estimating unit 111 performs uplink channel estimation by using the SRS, and outputs a channel estimation result to the transmission-streams-number determining unit 112.

The transmission-streams-number determining unit 112 determines the number of transmission streams most suitable for each PUE by using the channel estimation result in the channel estimating unit 111, and outputs the result to the scheduling unit 113. The number of transmission streams determined by the transmission-streams-number determining unit 112 is the number of streams most suitable for each PUE in the uplink PUSCH.

The assignment-streams-number determining unit 114 determines the number $A_p(i)$ of assignment streams at the pico base station 10, and outputs the result to the scheduling unit 113 and the interference-signals-number computing unit 115.

The interference-signals-number computing unit 115 computes the number $B_p(i)$ of removable interference signals at the pico base station 10, forms a notification signal indicating $B_p(i)$, and outputs the formed notification signal to the notification signal transmitting unit 116.

The notification signal transmitting unit 116 transmits the notification signal indicating $B_p(i)$ to the macro base station BS1.

The scheduling unit 113 performs scheduling of an uplink radio frequency resource in accordance with the number of transmission streams determined by the transmission-streams-number determining unit 112 and the number $A_p(i)$ of assignment streams. In other words, the scheduling unit 113 assigns an uplink transmission stream to each PUE while distributing the number of transmission streams determined by the transmission-streams-number determining unit 112 to each of the radio frequency resources in accordance with the number $A_p(i)$ of assignment streams. The scheduling unit 113 forms a control signal indicating the scheduling result and outputs the formed control signal to the transmission processing unit 117.

The transmission processing unit 117 performs an encoding process and a modulation process on the control signal input from the scheduling unit 113, and outputs a control signal after the modulation process to the RF transmitting unit 118.

The RF transmitting unit 118 performs a radio transmission process such as digital-to-analog conversion and up-conversion on the control signal input from the transmission processing unit 117, and transmits the control signal after the radio transmission process to PUE via the duplexer 102 and the antenna unit 101.

Configuration of Macro Base Station

Figure 7:
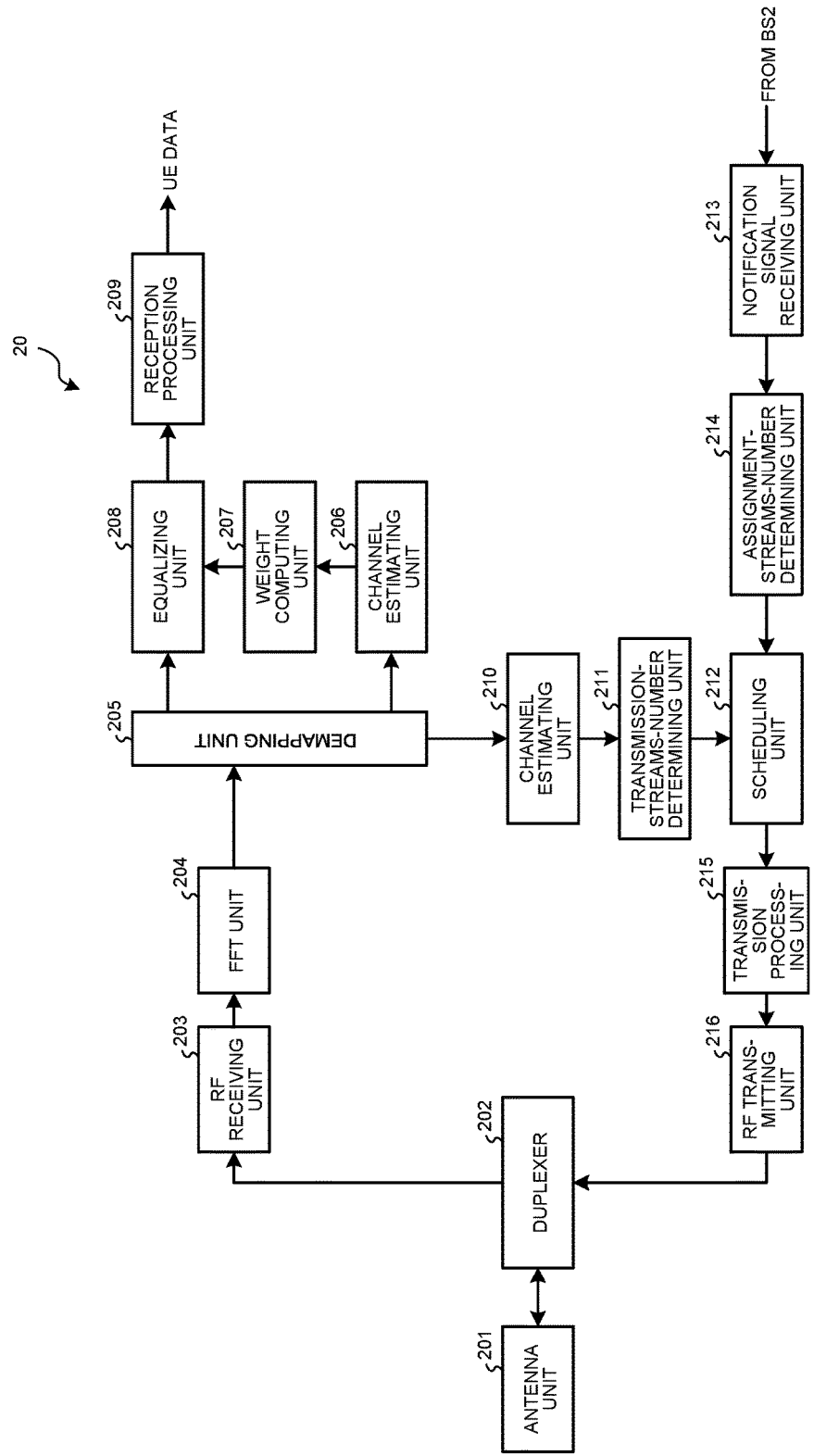
FIG. 7 is a functional block diagram illustrating a configuration example of a macro base station according to the first embodiment.

FIG. 7 is a functional block diagram illustrating a configuration example of a macro base station according to the first embodiment. The macro base station 20 illustrated in FIG. 7 is equivalent to the macro base station BS1 illustrated in FIG. 1.

In FIG. 7, the macro base station 20 includes an antenna unit 201, a duplexer 202, an RF receiving unit 203, an FFT unit 204, a demapping unit 205, a channel estimating unit 206, and a weight computing unit 207. The macro base station 20 further includes an equalizing unit 208, a reception processing unit 209, a channel estimating unit 210, a transmission-streams-number determining unit 211, a scheduling unit 212, an assignment-streams-number determining unit 214, and a notification signal receiving unit 213. The macro base station 20 further includes a transmission processing unit 215 and an RF transmitting unit 216.

The antenna unit 201 is formed of a plurality of antennas. Because the macro base station 20 includes the duplexer 202, the plurality of antennas that forms the antenna unit 201 functions as receiving antennas and transmitting antennas. Therefore, the number of the plurality of antennas is equivalent to the number of receiving antennas or the number of transmitting antennas.

The RF receiving unit 203 receives an OFDM signal transmitted from MUE via the antenna unit 201 and the duplexer 202. The RF receiving unit 203 performs a radio reception process such as down-conversion and analog-to-digital conversion on the received OFDM signal to obtain a baseband OFDM signal, and outputs this signal to the FFT unit 204. Herein, CP is added to the baseband OFDM signal.

The FFT unit 204 removes CP from the baseband OFDM signal, perform an FFT process on an OFDM signal after removing CP to convert the OFDM signal into a frequency-domain signal, and outputs the frequency-domain signal to the demapping unit 205.

The demapping unit 205 extracts a PUSCH signal, a DMRS, and an SRS from the frequency-domain signal. The demapping unit 205 outputs the PUSCH signal to the equalizing unit 208, outputs the DMRS to the channel estimating unit 206, and outputs the SRS to the channel estimating unit 210.

The channel estimating unit 206 performs uplink channel estimation by using the DMRS, and outputs a channel estimation result to the weight computing unit 207.

The weight computing unit 207 computes the reception weight $W^H$ illustrated in Equation (1) by using the channel estimation result in the channel estimating unit 206, and outputs the reception weight to the equalizing unit 208.

The equalizing unit 208 performs an equalization process using MMSE on the PUSCH signal by multiplying the reception weight $W^H$ illustrated in Equation (1) by the PUSCH signal, and outputs a PUSCH signal after the equalization process to the reception processing unit 209.

The reception processing unit 209 performs a demodulation process and a decoding process on the PUSCH signal after the equalization process to obtain UE data. The UE data is data transmitted from each MUE.

The channel estimating unit 210 performs uplink channel estimation by using the SRS, and outputs a channel estimation result to the transmission-streams-number determining unit 211.

The transmission-streams-number determining unit 211 determines the number of transmission streams most suitable for each MUE by using the channel estimation result in the channel estimating unit 210, and outputs the result to the scheduling unit 212. The number of transmission streams determined by the transmission-streams-number determining unit 211 is the number of streams most suitable for each MUE in the uplink PUSCH.

The notification signal receiving unit 213 receives a notification signal transmitted from the pico base station BS2 and outputs this signal to the assignment-streams-number determining unit 214. The notification signal indicates the number $B_p(i)$ of removable interference signals at the pico base station BS2.

The assignment-streams-number determining unit 214 determines the number $A_m(i)$ of assignment streams at the macro base station 20 by using $B_p(i)$ indicated by the notification signal from the pico base station BS2 as an upper limit, and outputs the result to the scheduling unit 212.

The scheduling unit 212 performs scheduling of an uplink radio frequency resource in accordance with the number of transmission streams determined by the transmission-streams-number determining unit 211 and the number $A_m(i)$ of assignment streams determined by the assignment-streams-number determining unit 214. In other words, the scheduling unit 212 assigns an uplink transmission stream to each MUE while distributing the number of transmission streams determined by the transmission-streams-number determining unit 211 to each of the radio frequency resources in accordance with the number $A_m(i)$ of assignment streams. The scheduling unit 212 forms a control signal indicating the scheduling result, and outputs the formed control signal to the transmission processing unit 215.

The transmission processing unit 215 performs an encoding process and a modulation process on the control signal input from the scheduling unit 212, and outputs a control signal after the modulation process to the RF transmitting unit 216.

The RF transmitting unit 216 performs a radio transmission process such as digital-to-analog conversion and up-conversion on the control signal input from the transmission processing unit 215, and transmits a control signal after the radio transmission process to MUE via the duplexer 202 and the antenna unit 201.

As described above, according to the first embodiment, the communication system 1 includes the macro base station BS1 and the pico base station BS2. The macro base station BS1 forms the coverage area A1. The pico base station BS2 forms the coverage area A2 smaller than the coverage area A1. The macro base station BS1 and the pico base station BS2 use the same predetermined radio resource. The pico base station BS2 determines the number of assignment streams at the pico base station BS2 in the predetermined radio resource. Moreover, the pico base station BS2 computes, in the predetermined radio resource, the number of interference signals removable by the pico base station BS2 on the basis of the number of receiving antennas included in the pico base station BS2 and the determined number of assignment streams. Moreover, the pico base station BS2 notifies the macro base station BS1 of the number of removable interference signals in the predetermined radio resource. The macro base station BS1 determines, in the predetermined radio resource, the number of assignment streams at the macro base station BS1 by using the number of interference signals removable by the pico base station BS2 as an upper limit.

The pico base station 10 forms the coverage area A2 smaller than the coverage area A1 formed by the macro base station 20. The pico base station 10 and the macro base station 20 use the same predetermined radio resource. The pico base station 10 includes the antenna unit 101 functioning as the plurality of receiving antennas, the assignment-streams-number determining unit 114, the interference-signals-number computing unit 115, and the notification signal transmitting unit 116. The assignment-streams-number determining unit 114 determines the number of assignment streams at its own station in the predetermined radio resource. The interference-signals-number computing unit 115 computes the number of interference signals removable by its own station in the predetermined radio resource on the basis of the number of the plurality of receiving antennas included in its own station and the number of assignment streams at its own station. The notification signal transmitting unit 116 transmits notification of the number of removable interference signals in the predetermined radio resource to the macro base station 20.

The macro base station 20 forms the coverage area A1 larger than the coverage area A2 formed by the pico base station 10. The macro base station 20 and the pico base station 10 use the same predetermined radio resource. The macro base station 20 includes the notification signal receiving unit 213 and the assignment-streams-number determining unit 214. The notification signal receiving unit 213 receives notification of the number of interference signals removable by the pico base station 10 in the predetermined radio resource, which is computed by the pico base station 10. The assignment-streams-number determining unit 214 determines, in the predetermined radio resource, the number of assignment streams at its own station by using the number of interference signals removable by the pico base station 10 as an upper limit.

By doing so, because the pico base station BS2 (the pico base station 10) can maintain the number of interference signals below "the number of receiving antennas−the number of desired signals", all interference signals can be surely removed by using IRC. Therefore, the pico base station BS2 can prevent the degradation of reception quality with the avoidance of interference from communication in the macro base station BS1.

[b] Second Embodiment

Configuration of Communication System

Because the configuration of a communication system according to the second embodiment is the same as that of the first embodiment (FIG. 1), their descriptions are omitted.

Process Sequence of Communication System

Figure 8:
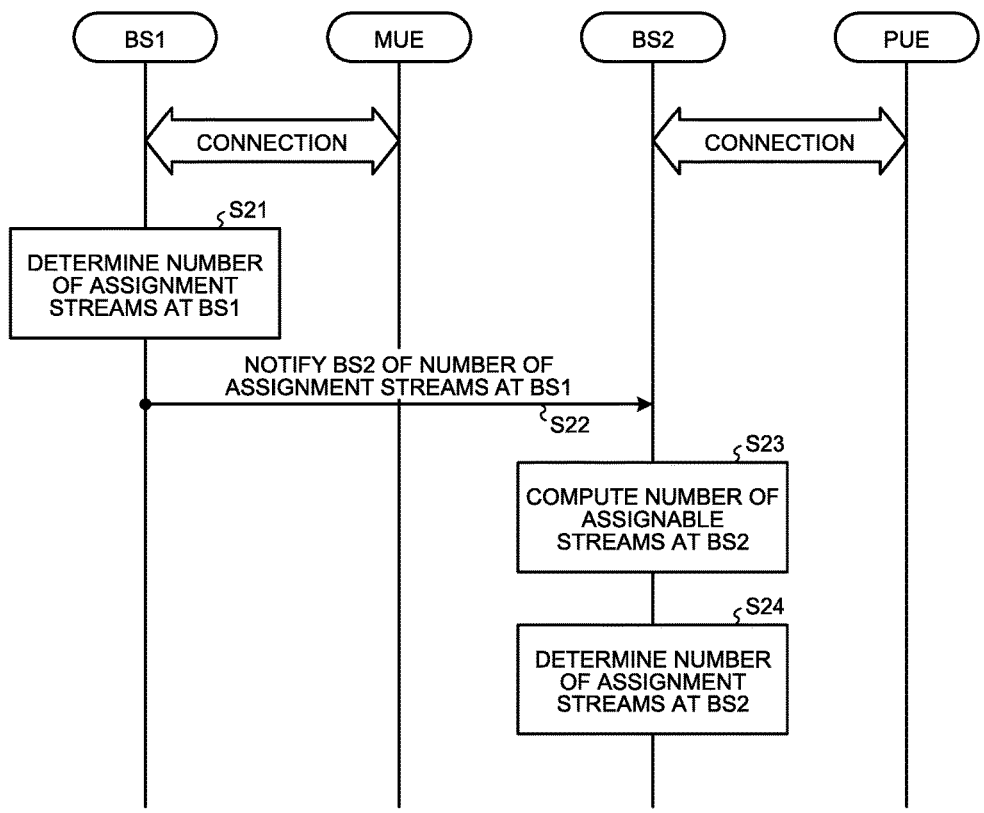
FIG. 8 is a diagram illustrating an example of a process sequence of a communication system according to a second embodiment.

FIG. 8 is a diagram illustrating an example of a process sequence of the communication system according to the second embodiment.

In a state where the macro base station BS1 and MUE are being connected to each other and the pico base station BS2 and PUE are being connected to each other, the macro base station BS1 determines the number of assignment streams at the macro base station BS1 (Step S21). The macro base station BS1 determines the number of assignment streams at the macro base station BS1 for each of the uplink radio frequency resources that are able to be used by both of the macro base station BS1 and the pico base station BS2. The number of assignment streams at the macro base station BS1 is the number of uplink transmission streams that are assigned to MUE.

Next, the macro base station BS1 notifies the pico base station BS2 of the number of assignment streams determined in Step S21 (Step S22).

The pico base station BS2 that receives the notification of Step S22 computes "the number of assignable streams" at the pico base station BS2 for each of the uplink radio frequency resources (Step S23). The pico base station BS2 computes the number of assignable streams for each of the uplink radio frequency resources on the basis of the number of receiving antennas included in the pico base station BS2 and the number of assignment streams at the macro base station BS1. For example, the pico base station BS2 computes, as the number of assignable streams, a number obtained by subtracting the number of assignment streams at the macro base station BS1 from the number of receiving antennas for each of the uplink radio frequency resources.

Next, the pico base station BS2 determines the number of assignment streams at the pico base station BS2 by using the number of assignable streams computed in Step S23 as an upper limit (Step S24). The number of assignment streams at the pico base station BS2 is the number of uplink transmission streams that are assigned to PUE.

Operation of Communication System

Figure 9:
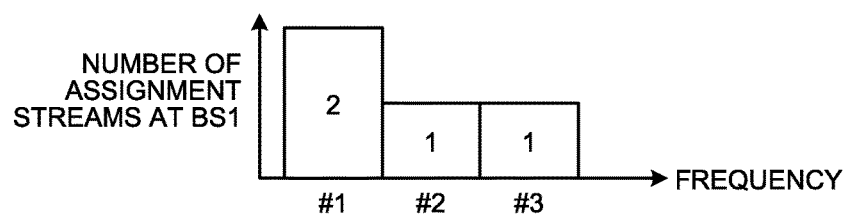
FIG. 9 is a diagram explaining an operation example of the communication system according to the second embodiment.
Figure 10:
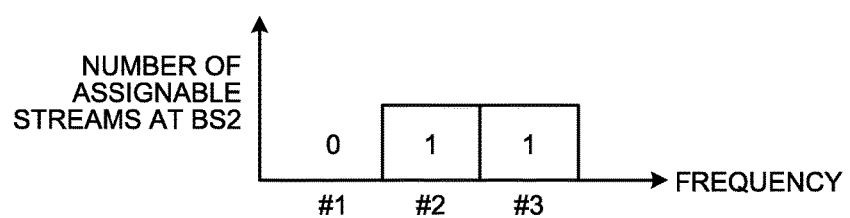
FIG. 10 is a diagram explaining an operation example of the communication system according to the second embodiment.
Figure 11:
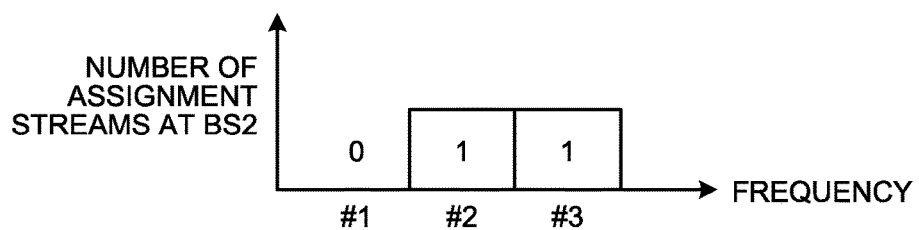
FIG. 11 is a diagram explaining an operation example of the communication system according to the second embodiment.

FIGS. 9 to 11 are diagrams explaining an operation example of the communication system according to the second embodiment. In FIGS. 9 to 11, each of the radio frequency resources #1, #2, and #3 is an uplink radio frequency resource that is able to be used by both of the macro base station BS1 and the pico base station BS2.

First, the macro base station BS1 determines the number $A_m(i)$ of assignment streams for each of the radio frequency resources #1, #2, and #3. In this case, "i" indicates a number of a radio frequency resource. Herein, "1", "2", and "3" correspond to #1, #2, and #3 respectively. For example, as illustrated in FIG. 9, the macro base station BS1 determines the number $A_m(1)$ of assignment streams of the radio frequency resource #1 to "2", determines the number $A_m(2)$ of assignment streams of the radio frequency resource #2 to "1", and determines the number $A_m(3)$ of assignment streams of the radio frequency resource #3 to "1". The macro base station BS1 assigns, until the determined number of assignment streams is updated, an uplink transmission stream to each MUE for each subframe so that the number of streams of each radio frequency resource is identical with the number $A_m(i)$ of assignment streams. For example, the macro base station BS1 simultaneously assigns MUEs #3 and #4 to the radio frequency resource #1 to perform MU-MIMO communication, and respectively assigns MUEs #1 and #2 performing SIMO communication to the radio frequency resources #2 and #3.

Next, the macro base station BS1 notifies the pico base station BS2 of the number Am(i) of assignment streams.

The pico base station BS2 that receives the notification of $A_m(i)$ computes the number $C_p(i)$ of assignable streams at the pico base station BS2 for each of the radio frequency resources #1, #2, and #3 in accordance with Equation (5). In Equation (5), "Np" indicates the number of receiving antennas of the pico base station BS2.

$$C_p(i)=N_p-A_m(i) \quad (5)$$

Therefore, for example, when the number of assignment streams at the macro base station BS1 is as illustrated in FIG. 9 and "$N_p=2$", the number of assignable streams at the pico base station BS2 becomes as illustrated in FIG. 10. In other words, the pico base station BS2 is able to assign one uplink stream to each of the radio frequency resources #2 and #3, and is not able to assign an uplink stream to the radio frequency resource #1.

Then, the pico base station BS2 determines the number $A_p(i)$ of assignment streams at the pico base station BS2 by using $C_p(i)$ as an upper limit for each of the radio frequency resources #1, #2, and #3. For example, the pico base station BS2 determines $A_p(i)$ in accordance with Equation (6). Therefore, the number of assignment streams at the pico base station BS2 becomes as illustrated in FIG. 11.

$$A_p(i)=C_p(i) \quad (6)$$

Then, the pico base station BS2 assigns an uplink transmission stream to each PUE so that the number of streams of each of the radio frequency resources #1, #2, and #3 is identical with the number Ap(i) of assignment streams. For example, the pico base station BS2 does not assign PUE to the radio frequency resource #1 of which the number of assignment streams is "0", and respectively assigns PUEs #1 and #2 performing SIMO communication to the radio frequency resources #2 and #3 of which the number of assignment streams is "1". Alternatively, when respectively assigning PUEs #3 and #4 to the radio frequency resources #2 and #3, the pico base station BS2 changes communication with PUEs #3 and #4 from MU-MIMO communication to SIMO communication.

Configuration of Macro Base Station

Figure 12:
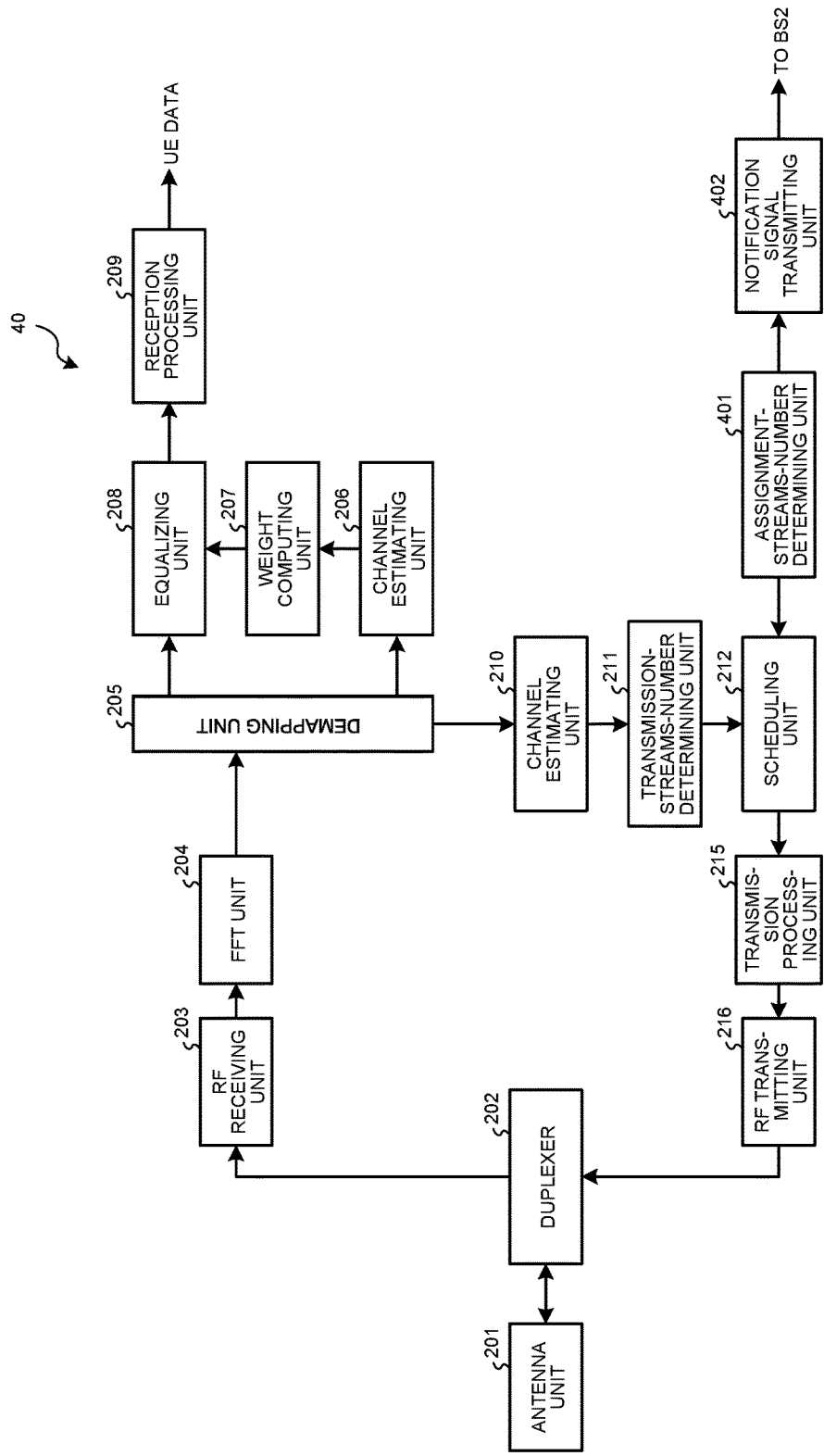
FIG. 12 is a functional block diagram illustrating a configuration example of a macro base station according to the second embodiment.

FIG. 12 is a functional block diagram illustrating a configuration example of a macro base station according to the second embodiment. The macro base station 40 illustrated in FIG. 12 is equivalent to the macro base station BS1 illustrated in FIG. 1.

In FIG. 12, the macro base station 40 includes the antenna unit 201, the duplexer 202, the RF receiving unit 203, the FFT unit 204, the demapping unit 205, the channel estimating unit 206, and the weight computing unit 207. The macro base station 40 further includes the equalizing unit 208, the reception processing unit 209, the channel estimating unit 210, the transmission-streams-number determining unit 211, the scheduling unit 212, an assignment-streams-number determining unit 401, and a notification signal transmitting unit 402. The macro base station 20 further includes the transmission processing unit 215 and the RF transmitting unit 216.

The assignment-streams-number determining unit 401 determines the number $A_m(i)$ of assignment streams at the macro base station 20 and outputs the result to the scheduling unit 212. Moreover, the assignment-streams-number determining unit 401 forms a notification signal indicating the determined number $A_m(i)$ of assignment streams, and outputs the formed notification signal to the notification signal transmitting unit 402.

The notification signal transmitting unit 402 transmits the notification signal indicating Am(i) to the pico base station BS2.

Configuration of Pico Base Station

Figure 13:
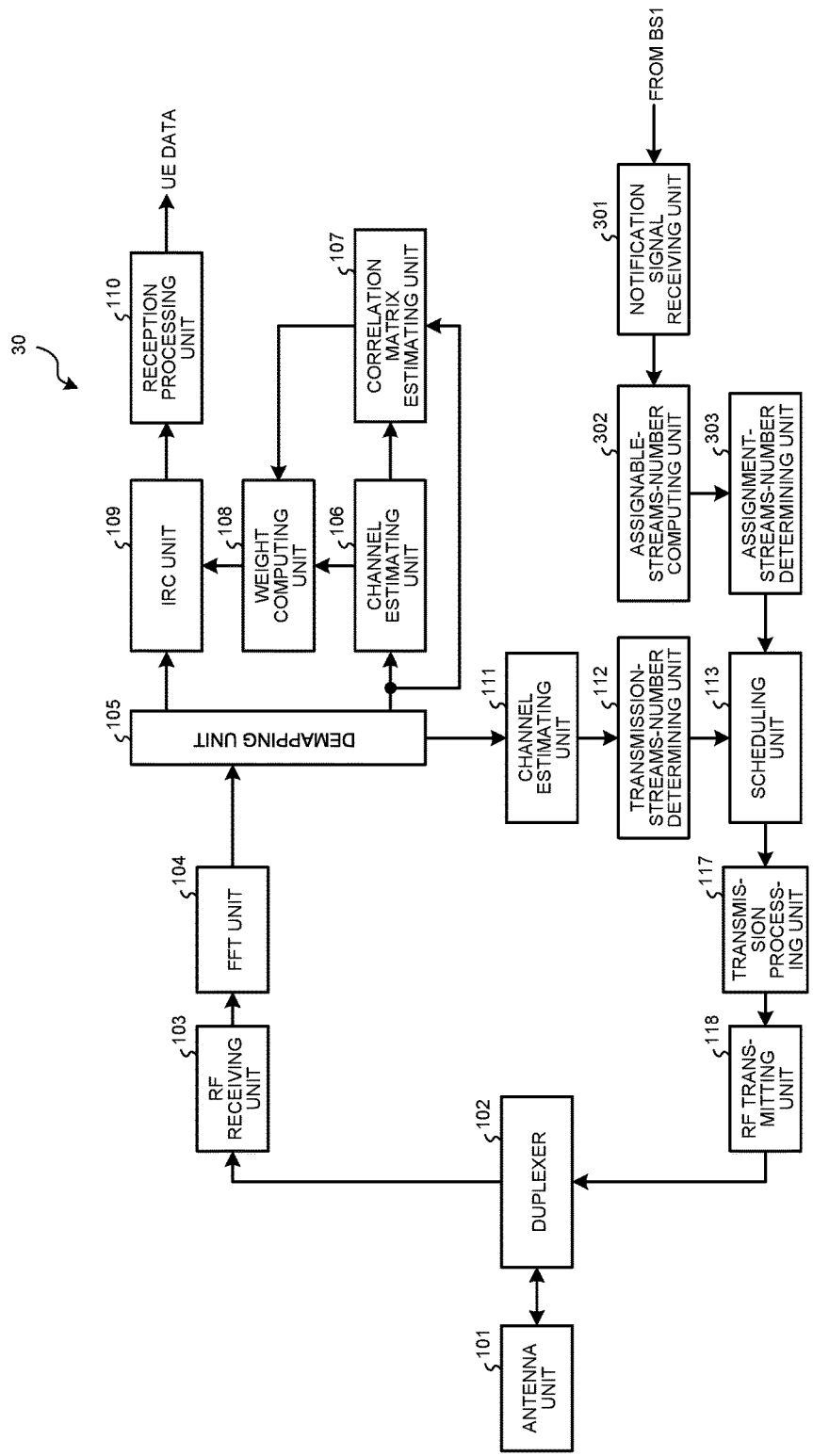
FIG. 13 is a functional block diagram illustrating a configuration example of a pico base station according to the second embodiment.

FIG. 13 is a functional block diagram illustrating a configuration example of a pico base station according to the second embodiment. The pico base station 30 illustrated in FIG. 13 is equivalent to the pico base station BS2 illustrated in FIG. 1.

In FIG. 13, the pico base station 30 includes the antenna unit 101, the duplexer 102, the RF receiving unit 103, the FFT unit 104, the demapping unit 105, the channel estimating unit 106, and the correlation matrix estimating unit 107. The pico base station 30 further includes the weight computing unit 108, the IRC unit 109, the reception processing unit 110, the channel estimating unit 111, the transmission-streams-number determining unit 112, the scheduling unit 113, an assignable-streams-number computing unit 302, and an assignment-streams-number determining unit 303. The pico base station 30 further includes a notification signal receiving unit 301, the transmission processing unit 117, and the RF transmitting unit 118.

The notification signal receiving unit 301 receives the notification signal transmitted from the macro base station BS1 and outputs the signal to the assignable-streams-number computing unit 302. The notification signal indicates the number $A_m(i)$ of assignment streams at the macro base station 40.

The assignable-streams-number computing unit 302 computes the number $C_p(i)$ of assignable streams at the pico base station 30, and outputs the result to the assignment-streams-number determining unit 303.

The assignment-streams-number determining unit 303 determines the number $A_p(i)$ of assignment streams at the pico base station 30 by using the number $C_p(i)$ of assignable streams as an upper limit, and outputs the result to the scheduling unit 113.

As described above, according to the second embodiment, the communication system 1 includes the macro base station BS1 and the pico base station BS2. The macro base station BS1 forms the coverage area A1. The pico base station BS2 forms the coverage area A2 smaller than the coverage area A1. The macro base station BS1 and the pico base station BS2 use the same predetermined radio resource. The macro base station BS1 determines the number of assignment streams at the macro base station BS1 in the predetermined radio resource. Moreover, the macro base station BS1 notifies the pico base station BS2 of the determined number of assignment streams. The pico base station BS2 computes the number of assignable streams at the pico base station BS2 in the predetermined radio resource on the basis of the number of receiving antennas included in the pico base station BS2 and the number of assignment streams at the macro base station BS1. Moreover, the pico base station BS2 determines the number of assignment streams at the pico base station BS2 in the predetermined radio resource by using the computed number of assignable streams as an upper limit.

The macro base station 40 forms the coverage area A1 larger than the coverage area A2 formed by the pico base station 30. The macro base station 40 and the pico base station 30 use the same predetermined radio resource. The macro base station 40 includes the assignment-streams-number determining unit 401 and the notification signal transmitting unit 402. The assignment-streams-number determining unit 401 determines the number of assignment streams at its own station in the predetermined radio resource. The notification signal transmitting unit 402 transmits the notification of the number of assignment streams at its own station to the pico base station 30.

The pico base station 30 forms the coverage area A2 smaller than the coverage area A1 formed by the macro base station 40. The pico base station 30 and the macro base station 40 use the same predetermined radio resource. The pico base station 30 includes the antenna unit 101 functioning as a plurality of receiving antennas, the notification signal receiving unit 301, the assignable-streams-number computing unit 302, and the assignment-streams-number determining unit 303. The notification signal receiving unit 301 receives the notification of the number of assignment streams at the macro base station 40, which is determined by the macro base station 40 in the predetermined radio resource. The assignable-streams-number computing unit 302 computes the number of assignable streams at its own station in the predetermined radio resource on the basis of the number of the plurality of receiving antennas included in its own station and the number of assignment streams at the macro base station 40. The assignment-streams-number determining unit 303 determines the number of assignment streams at its own station in the predetermined radio resource by using the number of assignable streams as an upper limit.

By doing so, because the pico base station BS2 (pico base station 30) can maintain the number of interference signals below "the number of receiving antennas−the number of desired signals", all interference signals can be surely removed by using IRC. Therefore, the pico base station BS2 can prevent the degradation of reception quality with the avoidance of interference from communication at the macro base station BS1.

[c] Third Embodiment

Configuration of Communication System

Figure 14:
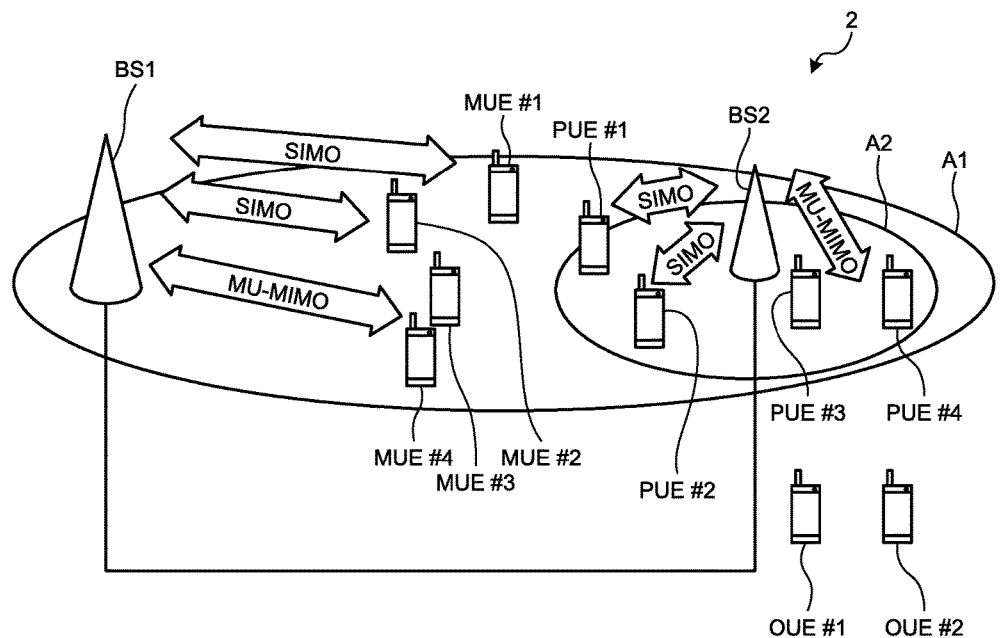
FIG. 14 is a diagram illustrating a configuration example of a communication system according to a third embodiment.

FIG. 14 is a diagram illustrating a configuration example of a communication system according to the third embodiment. The communication system 2 illustrated in FIG. 14 further includes OUE #1 and OUE #2 in addition to the communication system 1 illustrated in FIG. 1. The OUEs #1 and #2 are user equipment that is being connected to a base station that does not have a cooperative operation function or a base station that is not a target for a cooperative operation with the macro base station BS1 and the pico base station BS2. Hereinafter, when OUEs #1 and #2 are not distinguished, they may be collectively referred to as OUE. In the communication system 2, the pico base station BS2 suffers interference by a transmission stream from OUE as well as interference by a transmission stream from MUE. Although two OUEs are given as an example in FIG. 14, the number of OUEs is not limited to this example.

Process Sequence of Communication System

Figure 15:
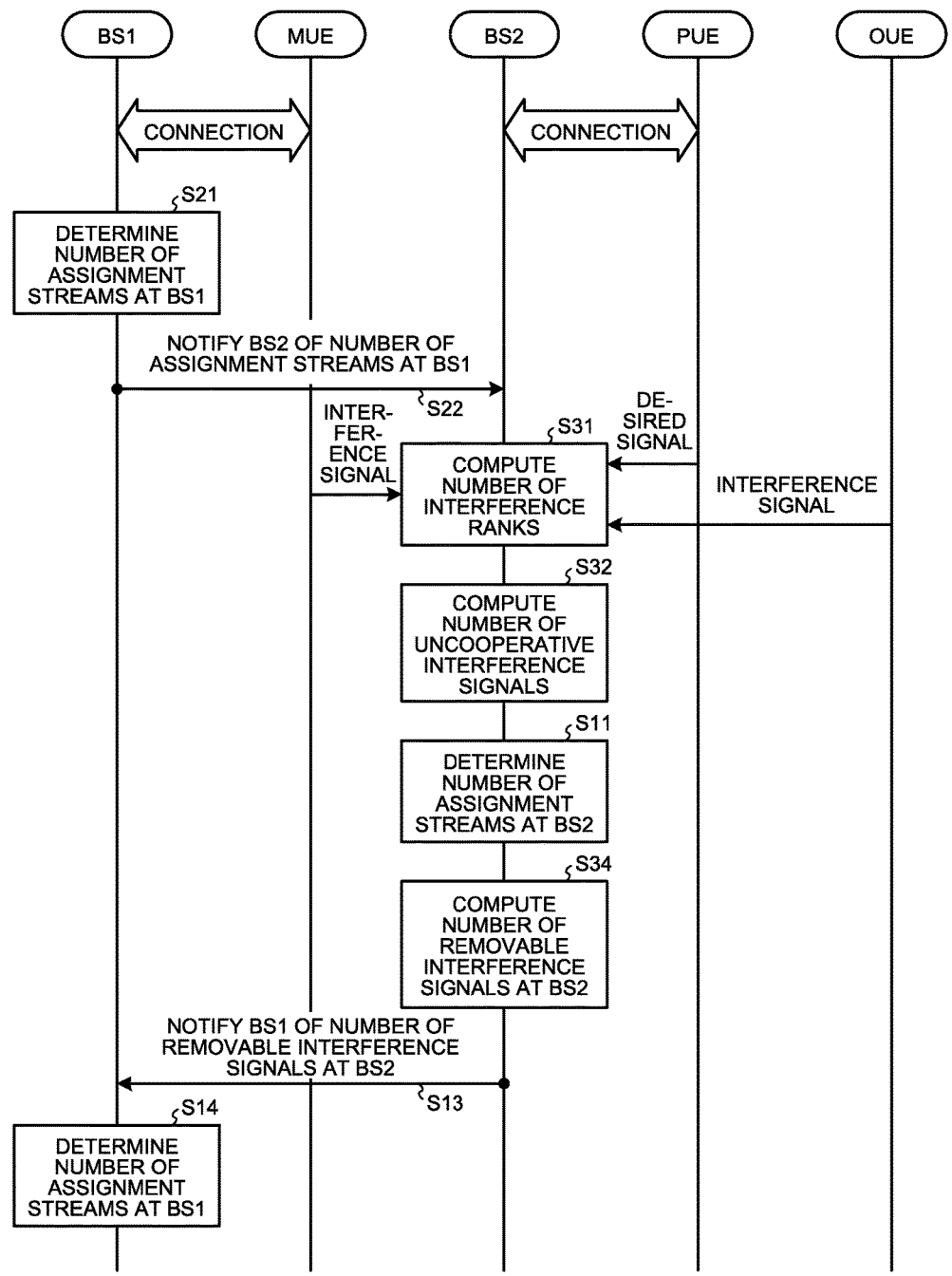
FIG. 15 is a diagram illustrating an example of a process sequence of the communication system according to the third embodiment.

FIG. 15 is a diagram illustrating an example of a process sequence of the communication system according to the third embodiment. In FIG. 15, because the processes of Steps S21 and S22 are the same as those of the second embodiment (FIG. 8), their descriptions are omitted.

The pico base station BS2 that receives the notification of Step S22 estimates a correlation matrix of an interference signal and then computes the number of interference ranks by using the correlation matrix, for each of the uplink radio frequency resources (Step S31).

Next, the pico base station BS2 computes the number of interference signals (hereinafter, may referred to as "uncooperative interference signals") that the pico base station BS2 receives from OUE (Step S32). The pico base station BS2 computes the number of uncooperative interference signals for each of the uplink radio frequency resources on the basis of the number of assignment streams at the macro base station BS1 and the number of interference ranks. For example, the pico base station BS2 computes, as the number of uncooperative interferences, a number obtained by subtracting the number of assignment streams at the macro base station BS1 from the number of uncooperative interference signals for each of the uplink radio frequency resources.

Next, similarly to the first embodiment, the pico base station BS2 determines the number of assignment streams at the pico base station BS2 (Step S11).

Next, the pico base station BS2 computes the number of removable interference signals at the pico base station BS2 (Step S34). The pico base station BS2 computes the number of removable interference signals for each of the uplink radio frequency resources on the basis of the number of receiving antennas included in the pico base station BS2, the number of assignment streams at the pico base station BS2, and the number of uncooperative interferences. For example, the pico base station BS2 computes, as the number of removable interference signals, a number obtained by subtracting the number of assignment streams and the number of uncooperative interferences from the number of receiving antennas for each of the uplink radio frequency resources.

Because the processes of Steps S13 and S14 from this are the same as those of the first embodiment, their descriptions are omitted.

Operation of Communication System

FIGS. 16 to 19 are diagrams explaining operation examples of the communication system according to the third embodiment. In FIGS. 16 to 19, each of the radio frequency resources #1, #2, and #3 is an uplink radio frequency resource that is able to be used by both of the macro base station BS1 and the pico base station BS2.

Because the determination of the number $A_m(i)$ of assignment streams at the macro base station BS1 and the notification of the number $A_m(i)$ of assignment streams to the pico base station BS2 are the same as those of the second embodiment, their descriptions are omitted.

The pico base station BS2 that receives the notification of $A_m(i)$ estimates a correlation matrix $R_I(i)$ of an interference signal in accordance with Equations (7) and (8) and computes the number $N_{Ip}(i)$ of interference ranks in accordance with Equation (9), for each of the radio frequency resources #1, #2, and #3.

First, the pico base station BS2 estimates the correlation matrix $R_I(i)$ of the interference signal in accordance with Equation (7). In Equation (7), "$y_p(i)$" indicates a received signal for a radio frequency resource "$h_p(i)$" indicates a channel estimation value between the pico base station BS2 and PUE assigned to the radio frequency resource and "$s_p(i)$" indicates a reference signal of PUE assigned to the radio frequency resource #i. For example, DMRS can be used as the reference signal. Moreover, "E[ ]" indicates an ensemble average.

$$R_I(i)=E[(y_p(i)-h_p(i)s_p(i))(y_p(i)-h_p(i)s_p(i))] \quad (7)$$

The correlation matrix $R_I(i)$ of Equation (7) can be expressed with Equation (8) in accordance with singular value decomposition. In Equation (8), "U" and "V" indicate a unitary matrix.

$$R_I(i)=U\mathrm{diag}(\lambda_1,\ldots,\lambda_N)V \quad (8)$$

Figure 16:
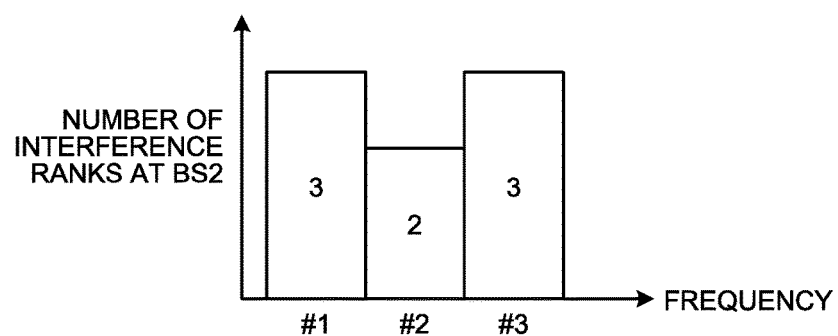
FIG. 16 is a diagram explaining an operation example of the communication system according to the third embodiment.

Next, the pico base station BS2 computes the number $N_{Ip}(i)$ of interference ranks in accordance with Equation (9) by using a singular value $\lambda_i$ (i=1 to N) indicated in Equation (8). In Equation (9), "$N_p$" indicates the number of receiving antennas of the pico base station BS2, "T" is a parameter for adjusting whether it is considered as interference, and "H(x)" is a step function in which H(x)=1 when x is not less than 0 and H(x)=0 when x is less than 0. The number $N_{Ip}(i)$ of interference ranks is equivalent to the total number of interference signals for each the radio frequency resource Herein, for example, as illustrated in FIG. 16, it is assumed that the number $N_{Ip}(1)$ of interference ranks is computed to "3", the number $N_{Ip}(2)$ of interference ranks is computed to "2", and the number $N_{Ip}(3)$ of interference ranks is computed to "3".

$$N_{Ip}(i) = \sum_{i=1}^{N_p} H(\lambda_i - T) \quad (9)$$

Next, the pico base station BS2 computes the number $N_{Ipo}(i)$ of uncooperative interference signals in accordance with Equation (10) for each of the radio frequency resources #1, #2, and #3.

$$N_{Ipo}(i)=N_{Ip}(i)-A_m(i) \quad (10)$$

Figure 17:
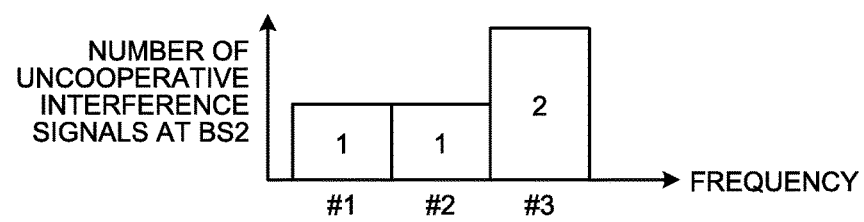
FIG. 17 is a diagram explaining an operation example of the communication system according to the third embodiment.

Therefore, for example, when the number of assignment streams at the macro base station BS1 is as illustrated in FIG. 9 and the number of interference ranks at the pico base station BS2 is as illustrated in FIG. 16, the number of uncooperative interference signals at the pico base station BS2 becomes as illustrated in FIG. 17.

Next, the pico base station BS2 determines the number $A_p(i)$ of assignment streams for each of the radio frequency resources #1, #2, and #3. For example, similarly to the first embodiment, the pico base station BS2 determines the number $A_p(1)$ of assignment streams of the radio frequency resource #1 to "2", determines the number $A_p(2)$ of assignment streams of the radio frequency resource #2 to "1", and determines the number $A_p(3)$ of assignment streams of the radio frequency resource #3 to "1", as illustrated in FIG. 3.

Next, the pico base station BS2 computes the number $B_p(i)$ of removable interference signals at the pico base station BS2 in accordance with Equation (11) for each of the radio frequency resources #1, #2, and #3. In Equation (11), "$N_p$" indicates the number of receiving antennas of the pico base station BS2.

$$B_p(i)=N_p-A_p(i)-N_{Ipo}(i) \quad (11)$$

Figure 18:
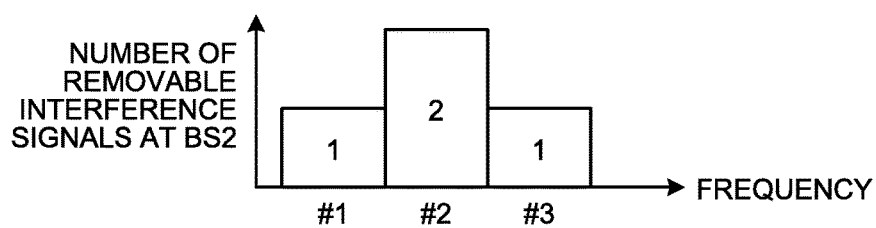
FIG. 18 is a diagram explaining an operation example of the communication system according to the third embodiment.
Figure 19:
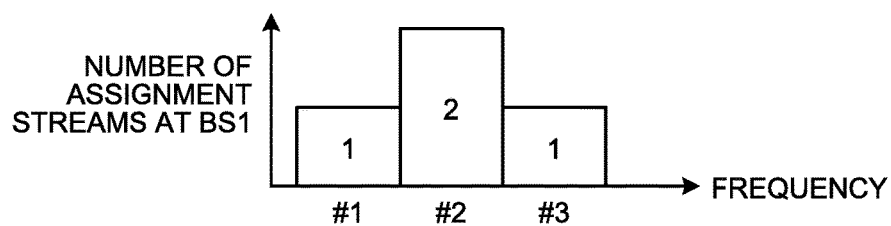
FIG. 19 is a diagram explaining an operation example of the communication system according to the third embodiment.

Therefore, for example, when the number of assignment streams at the pico base station BS2 is as illustrated in FIG. 3, the number of uncooperative interference signals at the pico base station BS2 is as illustrated in FIG. 17, and "$N_p$=4", the number of removable interference signals at the pico base station BS2 becomes as illustrated in FIG. 18. In other words, the pico base station BS2 can remove one interference signal for each of the radio frequency resources #1 and #3, and can remove two interference signals for the radio frequency resource #2.

Next, the pico base station BS2 notifies the macro base station BS1 of the number $B_p(i)$ of removable interference signals.

The operations of the macro base station BS1 that receives the notification of $B_p(i)$ are similar to those of the first embodiment. For example, the macro base station BS1 determines $A_m(i)$ in accordance with Equation (4). Therefore, the number of assignment streams at the macro base station BS1 is updated from matters originally determined by the macro base station BS1 and illustrated in FIG. 3 to matters illustrated in FIG. 19. Then, the macro base station BS1 assigns an uplink transmission stream to each MUE so that the number of streams of each of the radio frequency resources #1, #2, and #3 is identical with the number of assignment streams illustrated in FIG. 9.

Configuration of Macro Base Station

Figure 20:
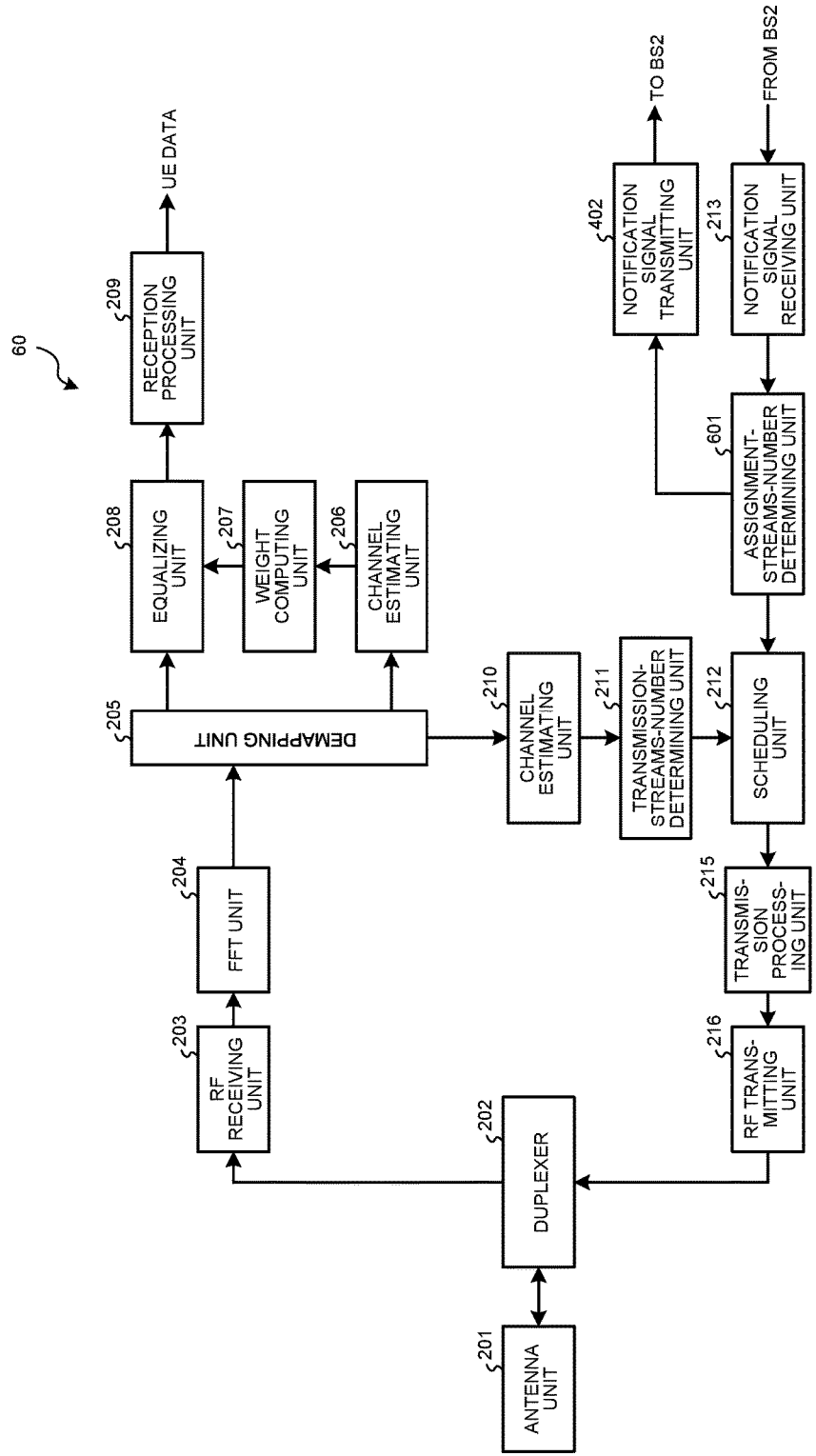
FIG. 20 is a functional block diagram illustrating a configuration example of a macro base station according to the third embodiment.

FIG. 20 is a functional block diagram illustrating a configuration example of a macro base station according to the third embodiment. The macro base station 60 illustrated in FIG. 20 is equivalent to the macro base station BS1 indicated in FIG. 14.

In FIG. 20, the macro base station 60 includes the antenna unit 201, the duplexer 202, the RF receiving unit 203, the FFT unit 204, the demapping unit 205, the channel estimating unit 206, and the weight computing unit 207. The macro base station 60 further includes the equalizing unit 208, the reception processing unit 209, the channel estimating unit 210, the transmission-streams-number determining unit 211, the scheduling unit 212, an assignment-streams-number determining unit 601, the notification signal transmitting unit 402, and the notification signal receiving unit 213. The macro base station 20 further includes the transmission processing unit 215 and the RF transmitting unit 216.

The notification signal receiving unit 213 receives the notification signal transmitted from the pico base station BS2 and outputs this signal to the assignment-streams-number determining unit 601. The notification signal indicates the number $B_p(i)$ of removable interference signals at the pico base station BS2.

The assignment-streams-number determining unit 601 determines the number $A_m(i)$ of assignment streams at the macro base station 60 by using $B_p(i)$ indicated in the notification signal from the pico base station BS2 as an upper limit, and outputs the result to the scheduling unit 212. Moreover, the assignment-streams-number determining unit 401 forms a notification signal indicating the determined number $A_m(i)$ of assignment streams, and outputs the formed notification signal to the notification signal transmitting unit 402.

Configuration of Pico Base Station

Figure 21:
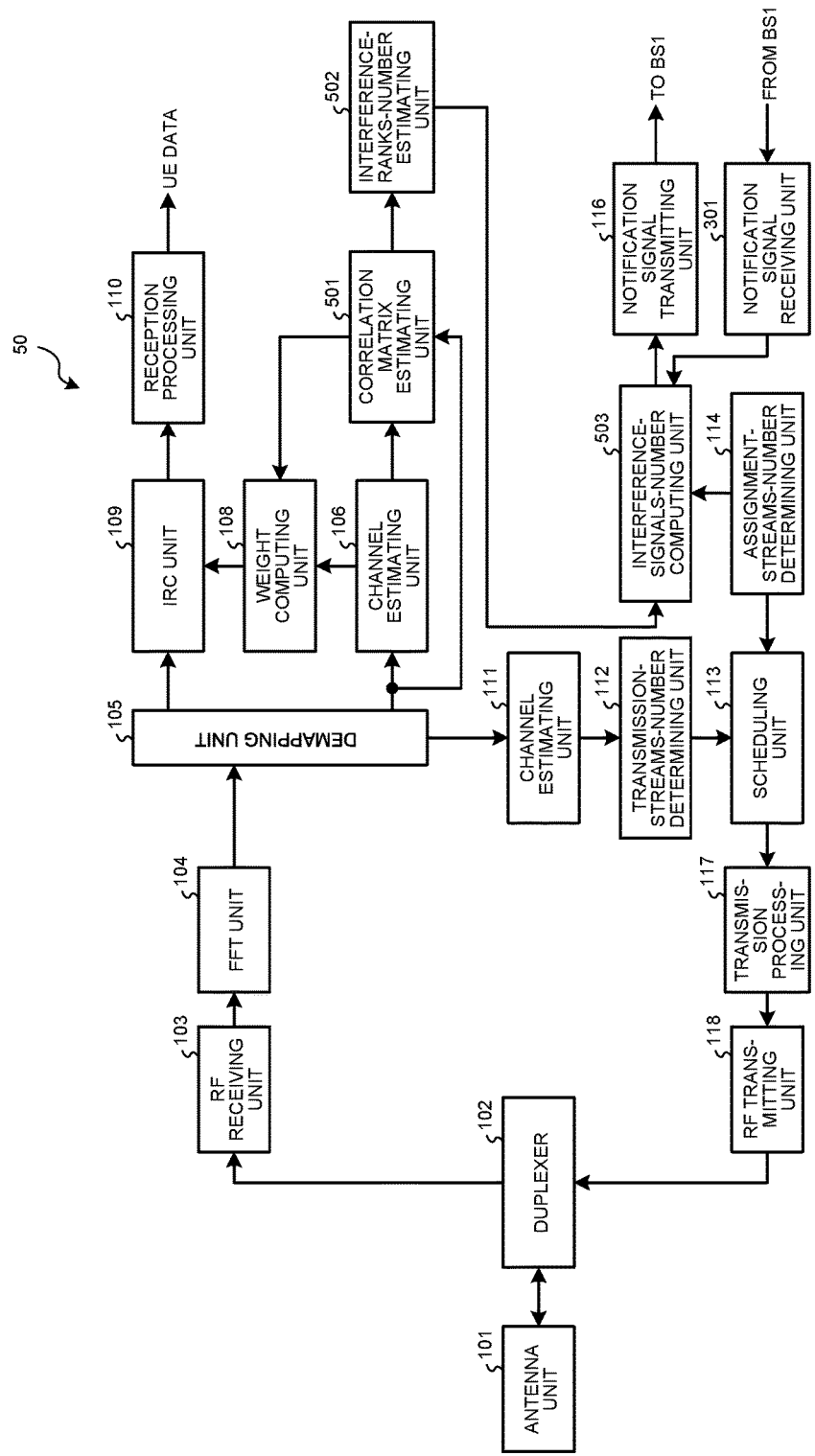
FIG. 21 is a functional block diagram illustrating a configuration example of a pico base station according to the third embodiment.

FIG. 21 is a functional block diagram illustrating a configuration example of a pico base station according to the third embodiment. The pico base station 50 illustrated in FIG. 21 is equivalent to the pico base station BS2 illustrated in FIG. 14.

In FIG. 21, the pico base station 50 includes the antenna unit 101, the duplexer 102, the RF receiving unit 103, the FFT unit 104, the demapping unit 105, the channel estimating unit 106, a correlation matrix estimating unit 501, and an interference-ranks-number estimating unit 502. The pico base station 50 further includes the weight computing unit 108, the IRC unit 109, the reception processing unit 110, the channel estimating unit 111, the transmission-streams-number determining unit 112, the scheduling unit 113, the assignment-streams-number determining unit 114, and an interference-signals-number computing unit 503. The pico base station 50 further includes the notification signal transmitting unit 116, the notification signal receiving unit 301, the transmission processing unit 117, and the RF transmitting unit 118.

The correlation matrix estimating unit 501 estimates the correlation matrix $R_I(i)$ indicated in Equations (7) and (8) by using the channel estimation result in the channel estimating unit 106, and outputs the correlation matrix $R_I(i)$ to the weight computing unit 108 and outputs the singular value $\lambda_i$ to the interference-ranks-number estimating unit 502.

The interference-ranks-number estimating unit 502 estimates the number $N_{Ip}(i)$ of interference ranks indicated in Equation (9) by using the singular value $\lambda_i$, and outputs the result to the interference-signals-number computing unit 503.

The assignment-streams-number determining unit 114 determines the number $A_p(i)$ of assignment streams at the pico base station 50 and outputs the result to the scheduling unit 113 and the interference-signals-number computing unit 503.

The notification signal receiving unit 301 receives the notification signal transmitted from the macro base station BS1 and outputs this signal to the interference-signals-number computing unit 503. The notification signal indicates the number $A_m(i)$ of assignment streams at the macro base station 40.

The interference-signals-number computing unit 503 first computes the number $N_{Ipo}(i)$ of uncooperative interference signals indicated in Equation (10). Next, the interference-signals-number computing unit 503 computes the number $B_p(i)$ of removable interference signals at the pico base station 50 in accordance with Equation (11). Then, the interference-signals-number computing unit 503 forms a notification signal indicating $B_p(i)$, and outputs the formed notification signal to the notification signal transmitting unit 116.

As described above, according to the third embodiment, in the communication system 2, the pico base station BS2 estimates the number of interference ranks by using a correlation matrix of an interference signal. Moreover, the pico base station BS2 computes the number of interference signals removable by the pico base station BS2 in the predetermined radio resource on the basis of the estimated number of interference ranks, the number of assignment streams at the macro base station BS1, the number of receiving antennas included in the pico base station BS2, and the number of assignment streams at the pico base station BS2.

The pico base station 50 includes the interference-ranks-number estimating unit 502 and the interference-signals-number computing unit 503. The interference-ranks-number estimating unit 502 estimates the number of interference ranks by using the correlation matrix of the interference signal. The interference-signals-number computing unit 503 computes the number of interference signals removable by its own station in the predetermined radio resource on the basis of the estimated number of interference ranks, the number of assignment streams at the macro base station BS1, the number of receiving antennas included in its own station, and the number of assignment streams at its own station.

By doing so, the pico base station BS2 (pico base station 50) can maintain the number of interference signals below "the number of receiving antennas−the number of desired signals" even when suffering interference from user equipment being connected to a base station that does not have a cooperative operation function or a base station that is not a target for a cooperative operation with the macro base station BS1 and the pico base station BS2.

[d] Other Embodiments

[1] In the first embodiment, when the number of macro base stations that can perform a cooperative operation with the pico base station BS2 is two or more, it is preferable to set the number $B_{p,k}(i)$ of removable interference signals to satisfy Equation (12). Herein, the notification of the number $B_{p,k}(i)$ is performed from the pico base station BS2 to each macro base station #k. In Equation (12), "$N_M$" indicates the number of macro base stations.

$$\sum_{k=1}^{N_M} B_{p,k}(i) = B_p(i) \qquad (12)$$

[2] In the first embodiment, when a distance between MUE and the pico base station BS2 is large and a path loss from MUE to the pico base station BS2 is not less than a threshold, PUE may be assign to the radio frequency resource #1 assuming that interference to the pico base station BS2 is small.

[3] In the first embodiment, when channel information between MUE and the pico base station BS2 is well-known, multiuser multiplexing may be performed in the radio frequency resources #2 and #3 upon satisfying a predetermined condition. The predetermined condition means that the number of ranks of a matrix $H_{imu}$ (Equation (13)) of an interference signal from multiuser of MU-MIMO communication to the pico base station 10 becomes "1". In Equation (13), "$h_{Ix}$" indicates a channel matrix between the xth multiuser and the pico base station 10. Moreover, it is preferable that the estimation of the number of ranks is performed in accordance with Equation (9).

$$H_{imu} = \begin{bmatrix} h_{I_1} \\ \vdots \\ h_{I_{N_{mu}}} \end{bmatrix} \qquad (13)$$

[4] In the first embodiment, to decrease the number of interference signals to the pico base station 10, it may decrease the number of streams of MIMO communication between the macro base station BS1 and MUE.

[5] In the second embodiment, when a radio frequency resource to which PUE is assigned is restricted, it may notify the pico base station 10 of the number $A_m(i)$ of assignment streams for only the restricted radio frequency resource.

[6] In the first embodiment, when the number of macro base stations that can perform a cooperative operation with the pico base station BS2 is two or more, it is preferable to compute the number $C_p(i)$ of assignable streams at the pico base station BS2 by using Equation (14) instead of Equation (5). In Equation (14), "$N_M$" indicates the number of macro base stations, and "$A_{m,k}(i)$" indicates the number of assignment streams at the macro base station #k.

$$A_p(i) = N_p - \sum_{k=1}^{N_M} A_{m,k}(i) \qquad (14)$$

[7] In the third embodiment, it may perform the estimation of the number of interference ranks multiple times ($T_{ave}$ times) to calculate an average number of interference ranks in accordance with Equation (15). In Equation (15), "$N_{Ip,j}$" indicates the jth-estimated number of interference ranks that is estimated in accordance with Equation (9).

$$N_{Ip}(i) = \sum_{j=1}^{T_{ave}} N_{Ip,j}(i) / T_{ave} \qquad (15)$$

[8] In the first to third embodiments, a frequency resource is given as an example of a radio resource. In other words, in the first to third embodiments, a radio resource is defined by frequency. However, the disclosed technology can be applied to a communication system in which a radio resource is defined by time. In other words, the disclosed technology can be applied to a TDD (Time Division Duplex) communication system that uses different unit times at uplink and downlink.

[9] In the first to third embodiments, the case where the communication system 1 includes the macro base station BS1 and the pico base station BS2 has been explained as an example. However, the disclosed technology can be applied to a communication system in which both of BS1 and BS2 illustrated in FIGS. 1 and 14 are a macro base station or a communication system in which both of BS1 and BS2 illustrated in FIGS. 1 and 14 are a pico base station. In other words, the disclosed technology can be applied to a communication system in which the size of the coverage area A1 is same as the size of the coverage area A2 as well as a communication system in which the size of the coverage area A1 is different from the size of the coverage area A2. In other words, it is only sufficient that the coverage areas A1 and A2 have different coverage areas.

Figure 22:
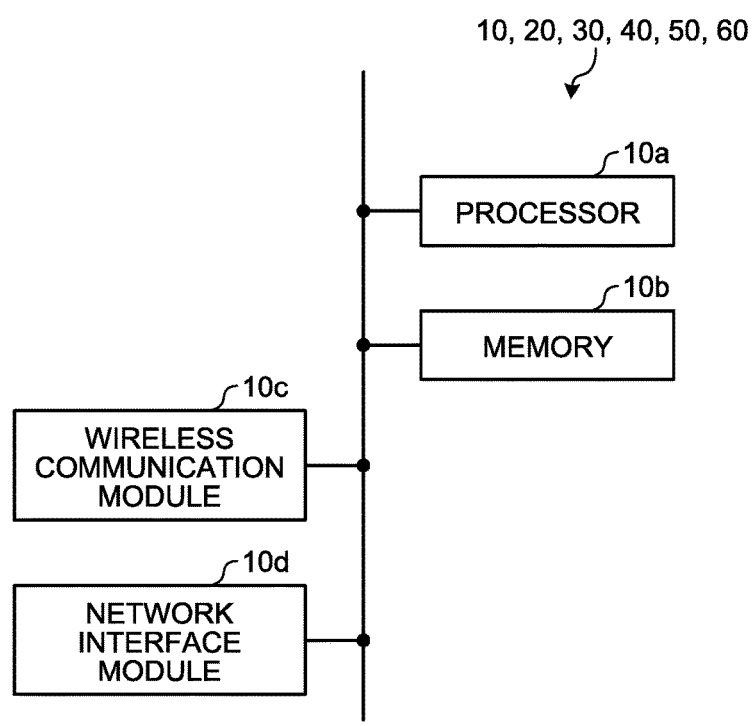
FIG. 22 is a diagram illustrating a hardware configuration example of a base station.

[10] The base stations 10, 20, 30, 40, 50, and 60 of the first to third embodiments can be realized by the following hardware configuration. FIG. 22 is a diagram illustrating a hardware configuration example of the base station. As illustrated in FIG. 22, each of the base stations 10, 20, 30, 40, 50, and 60 includes, as constituent elements of hardware, a processor 10a, a memory 10b, a wireless communication module 10c, and a network interface module 10d. As an example, the processor 10a includes a central processing unit (CPU), a digital signal processor (DSP), or a field programmable gate array (FPGA). Moreover, each of the base stations 10, 20, 30, 40, 50, and 60 may include a large scale integrated circuit (LSI) that includes the processor 10a and peripheral circuits. As an example, the memory 10b includes RAM such as SDRAM, ROM, or a flash memory.

The antenna units 101 and 201, the duplexers 102 and 202, the RF receiving units 103 and 203, and the RF transmitting units 118 and 216 are realized by the wireless communication module 10c. The notification signal transmitting units 116 and 402 and the notification signal receiving units 213 and 301 are realized by the network interface module 10d. The FFT units 104 and 204, the demapping units 105 and 205, the channel estimating units 106, 111, 206, and 210, the correlation matrix estimating units 107 and 501, and the interference-ranks-number estimating unit 502 are realized by the processor 10*a*. Moreover, the weight computing units 108 and 207, the IRC unit 109, the equalizing unit 208, and the reception processing units 110 and 209 are realized by the processor 10*a*. Moreover, the transmission-streams-number determining units 112 and 211, the scheduling units 113 and 212, and the transmission processing units 117 and 215 are realized by the processor 10*a*. Moreover, the assignment-streams-number determining units 114, 214, 303, 401, and 601, the interference-signals-number computing units 115 and 503, and the assignable-streams-number computing unit 302 are realized by the processor 10*a*.

As described above, according to an aspect of the embodiments, it is possible to prevent the degradation of reception quality with the avoidance of interference.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication system comprising:
 a first base station that forms a first coverage area; and
 a second base station that forms a second coverage area different from the first coverage area and uses a same as a radio resource to be used by the first base station, wherein
 the second base station:
 determines a number of assignment streams at the second base station in the radio resource;
 estimates a number of interference ranks by using a correlation matrix of an interference signal;
 computes a number of interference signals removable by the second base station in the radio resource based on the number of interference ranks, the number of assignment streams at the first base station, a number of receiving antennas included in the second base station, and the number of assignment streams at the second base station; and
 notifies the first base station of the number of interference signals in the radio resource, and
 the first base station determines a number of assignment streams at the first base station in the radio resource by using the number of interference signals as an upper limit.

2. A base station that forms a second coverage area different from a first coverage area formed by another base station and uses a same as a radio resource to be used by the other base station, the base station comprising:
 a plurality of receiving antennas;
 a memory; and
 a processor that is coupled to the memory and configured to execute a process, the process comprising:
 determining a number of assignment streams at the base station in the radio resource;
 estimating a number of interference ranks by using a correlation matrix of an interference signal;
 computing a number of interference signals removable by the base station in the radio resource based on the number of interference ranks, a number of assignment streams at the other base station, a number of the plurality of receiving antennas, and the number of assignment streams at the base station; and
 transmitting notification of the number of interference signals in the radio resource to the other base station.

3. A base-station control method that is performed by a second base station with respect to a first base station, the second base station forming a second coverage area different from a first coverage area formed by the first base station and using a same as a radio resource to be used by the first base station, the base station control method comprising:
 determining a number of assignment streams at the second base station in the radio resource;
 estimating a number of interference ranks by using a correlation matrix of an interference signal;
 computing a number of interference signals removable by the second base station in the radio resource based on the number of interference ranks, the number of assignment streams at the first base station, a number of a plurality of receiving antennas included in the second base station, and the number of assignment streams at the second base station; and
 transmitting notification of the number of interference signals in the radio resource from the second base station to the first base station to control a number of assignment streams at the first base station in the radio resource.

* * * * *